US011624323B2

(12) United States Patent
Chhabra et al.

(10) Patent No.: US 11,624,323 B2
(45) Date of Patent: Apr. 11, 2023

(54) AIR TURBINE STARTER WITH PRIMARY AND SECONDARY AIR FLOW PATHS

(71) Applicant: Unison Industries, LLC, Jacksonville, FL (US)

(72) Inventors: Parmeet Singh Chhabra, Bangalore (IN); Pankaj Kumar Morya, Bangalore (IN); Shiloh Montegomery Meyers, Miamisburg, OH (US); David Raju Yamarthi, Bangalore (IN); Steven Ryan Kerley, Columbus, OH (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/358,169

(22) Filed: Jun. 25, 2021

(65) Prior Publication Data

US 2022/0049613 A1    Feb. 17, 2022

(30) Foreign Application Priority Data

Aug. 13, 2020 (IN) .............................. 202011034887

(51) Int. Cl.
| | | |
|---|---|---|
| *F02C 7/277* | (2006.01) | |
| *F01D 5/08* | (2006.01) | |
| *F01D 9/06* | (2006.01) | |
| *F01D 9/04* | (2006.01) | |
| *F01D 11/00* | (2006.01) | |
| *F01D 5/00* | (2006.01) | |
| *F01D 25/24* | (2006.01) | |

(52) U.S. Cl.
CPC .............. *F02C 7/277* (2013.01); *F01D 5/085* (2013.01); *F01D 9/065* (2013.01); *F01D 5/00* (2013.01); *F01D 9/041* (2013.01); *F01D 11/001* (2013.01); *F01D 25/24* (2013.01); *F05D 2240/126* (2013.01); *F05D 2240/55* (2013.01)

(58) Field of Classification Search
CPC ................ F02C 7/277; F02C 7/18–185; F02C 7/04–057; F01D 5/081–087; F01D 5/18; F01D 5/182–184; F01D 5/186–189; F01D 5/027; F01D 5/046; F01D 5/08–081; F01D 5/10; F01D 9/065
See application file for complete search history.

(56) References Cited

U.S. PATENT DOCUMENTS

| | | | |
|---|---|---|---|
| 2,429,681 | A | 10/1947 | Griffith |
| 2,441,135 | A | 5/1948 | Chalupa |

(Continued)

FOREIGN PATENT DOCUMENTS

| | | | |
|---|---|---|---|
| EP | 2354496 A2 | | 8/2011 |
| GB | 866046 A1 | * | 3/1959 |

*Primary Examiner* — Stephanie Sebasco Cheng
(74) *Attorney, Agent, or Firm* — McGarry Bair PC

(57) ABSTRACT

An air turbine starter that includes a housing. The housing can circumscribe a turbine coupled that is coupled to a gear train in a gear box via a drive shaft. A primary air flow path is defined between a primary inlet and a primary outlet. Air in the primary air flow path can flow into a secondary air flow path or rotate the turbine, that converts energy from the air flow to rotational mechanical energy. Air in the secondary air flow path can pass through at least a first cavity and first passage before rejoining the primary air flow or joining ambient air.

19 Claims, 6 Drawing Sheets

(56) References Cited

U.S. PATENT DOCUMENTS

| | | | |
|---|---|---|---|
| 2,636,344 A | 4/1953 | Heath | |
| 4,867,633 A | 9/1989 | Gravelle | |
| 6,269,628 B1 | 8/2001 | Gates | |
| 6,623,238 B2 * | 9/2003 | Langston | F01D 11/00 |
| | | | 415/113 |
| 6,969,235 B2 | 11/2005 | Feest | |
| 6,991,425 B2 | 1/2006 | Kruegel et al. | |
| 8,672,637 B2 | 3/2014 | Zawilinski et al. | |
| 8,672,638 B2 | 3/2014 | Zawilinski et al. | |
| 8,678,747 B2 * | 3/2014 | Ni | F02C 7/277 |
| | | | 416/169 R |
| 9,631,515 B2 | 4/2017 | Oyarbide et al. | |
| 2001/0028845 A1 | 10/2001 | Langston et al. | |

\* cited by examiner

AIR TURBINE STARTER WITH PRIMARY AND SECONDARY AIR FLOW PATHS

CROSS-REFERENCE TO RELATED APPLICATION

This application claims priority to Indian Provisional Application No. 202011034887, filed Aug. 13, 2020, which is incorporated herein by reference in its entirety.

TECHNICAL FIELD

The disclosure generally relates to an air turbine starter, specifically an air turbine starter for a turbine engine, where the air turbine starter includes a primary air flow path and a secondary air flow path.

BACKGROUND

A turbine engine, for example a gas turbine engine, is engaged in regular operation to an air turbine starter. Air turbine starters are typically mounted to the turbine engine through a gear box or other transmission assembly. The transmission assembly transfers power from the air turbine starter to the turbine engine to assist in starting the turbine engine. The internal components of both the turbine engine and the air turbine starter spin together such that the air turbine starter can be used to start the turbine engine.

A typical air turbine starter has a housing that is divided into a dry portion and a wet portion by a seal structure. A turbine, which is coupled to a drive shaft, is located in the dry portion. The drive shaft extends from the turbine in the dry portion, through the seal structure, and into the wet portion. A gearbox, that receives the drive shaft, is located in the wet portion. The gear box selectively engages an output shaft that is coupled to the turbine engine. The drive shaft connects to the gear box such that rotation of the turbine rotates the drive shaft. The rotating drive shaft can rotate the gear box, which rotates the output shaft.

In typical air turbine starters, a primary air flow enters the air turbine starter through a primary inlet, where the primary air flow then passes into the primary air flow path. The primary air flow is guided to the blades of a turbine, which transforms some of the energy of the primary air flow into rotational mechanical energy before the primary air flow exits the air turbine starter through a primary outlet.

BRIEF DESCRIPTION

Aspects and advantages of the disclosure will be set forth in part in the following description, or may be obvious from the description, or may be learned through practice of the disclosure.

In one aspect, the disclosure relates to an air turbine starter that includes a housing that defines an interior having a primary inlet and a primary outlet to define a primary air flow path from the primary inlet to the primary outlet. A stator, located in the interior, defines at least a portion of the primary air flow path, where the stator includes a hub with a plurality of circumferentially spaced vanes that include a root and a tip to define a span-wise direction. A first passage extends from the root and the tip of at least one of the plurality of circumferentially spaced vanes. A turbine is located in the interior, downstream of the stator. The turbine includes a rotor with a plurality of circumferentially spaced blades that extend into the primary air flow path. A first cavity is defined by a forward face of the rotor and a rear face of the hub. A secondary air flow path fluidly connects the first cavity with either the primary air flow path downstream of the turbine or ambient air. The secondary air flow is at least partially defined by the first passage.

In another aspect, the disclosure relates to an air turbine starter that includes a housing that defines an interior having a primary inlet and a primary outlet to define a primary air flow path from the primary inlet to the primary outlet. A stator is located in the interior and defines at least a portion of the primary air flow path. The stator includes a hub with a plurality of circumferentially spaced vanes. A turbine is located in the interior downstream of the stator. The turbine includes a rotor with a plurality of circumferentially spaced blades that extend into the primary air flow path. A first cavity is defined by a forward face of the rotor and a rear face of the stator. A secondary air flow path fluidly connects the first cavity with the primary air flow path downstream of the turbine or ambient air.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which refers to the appended FIGS., in which.

DETAILED DESCRIPTION

Figure 1:
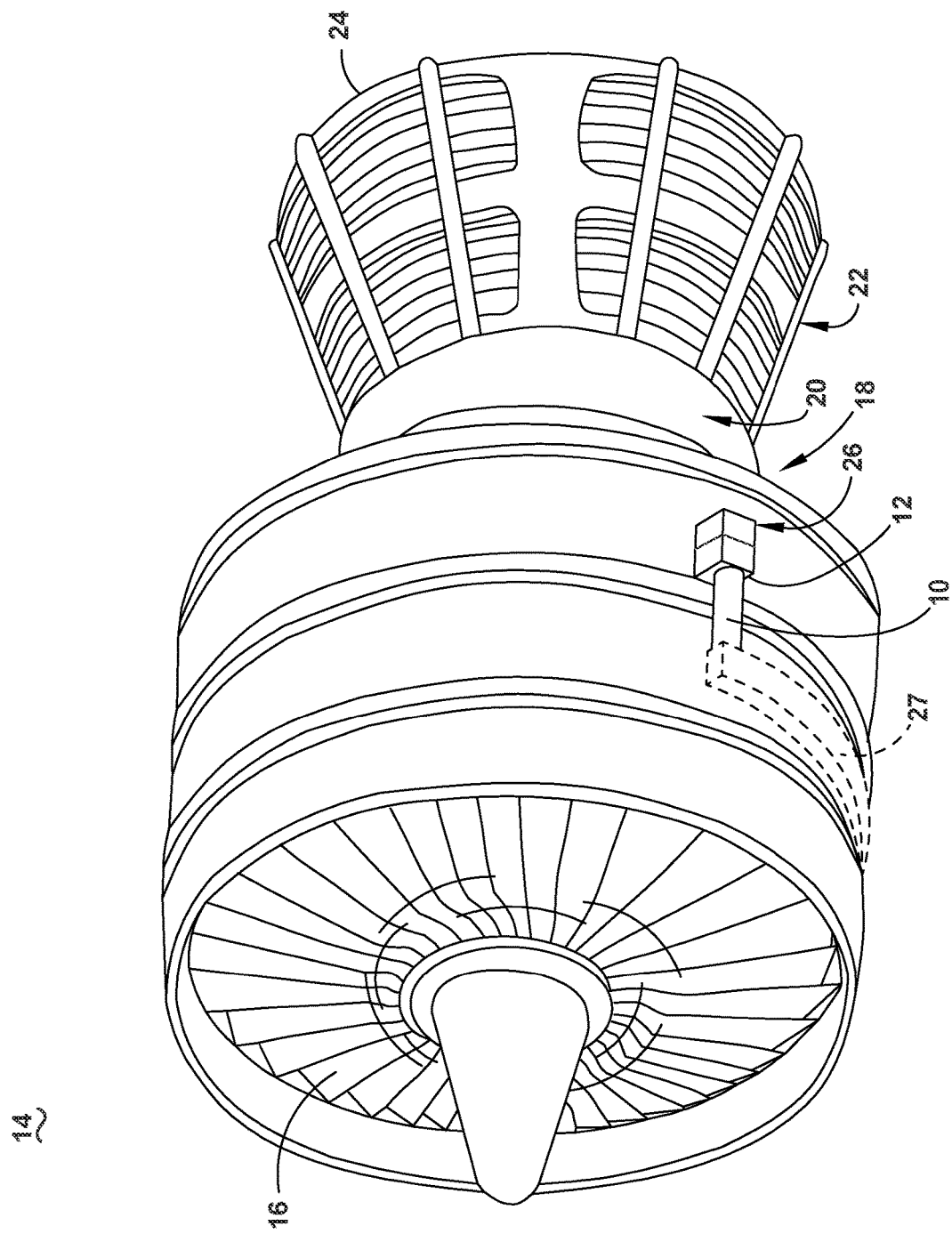
FIG. 1 is a schematic illustration of a turbine engine with an air turbine starter.

Aspects of the disclosure described herein are directed to a turbine engine with an air turbine starter that includes a primary air flow path and a secondary air flow path. A portion of the air flow from the primary air flow path enters a first cavity through a first cavity inlet. The first cavity inlet can be a gap located between a plurality of vanes and blades housed within the air turbine starter. The portion of the air flow from the primary air flow path that enters the first cavity can increase the pressure differential across a rotor. Increasing the pressure differential across the rotor can result in an axial force on the rotor or a drive shaft coupled to the rotor. To reduce or eliminate the pressure differential across the rotor, air from the first cavity can flow out of the first cavity via the secondary air flow path.

For purposes of illustration, the present disclosure will be described with respect to an air turbine starter for a turbine engine. The disclosure can have applicability in a variety of vehicles or engines, and can be used to provide benefits in industrial, commercial, and residential applications. Further non-limiting examples of other vehicles or engines to which the disclosure can relate can include boats, aircraft, helicopters, cars, or other aquatic, air, space, or land vehicles. Industrial, commercial, or residential applications of the disclosure can include, but are not limited to, marine power plants, wind turbines, or small power plants.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, a starter motor or air turbine starter 10 is coupled to an accessory gear box (AGB) 12, also known as a transmission housing, and together are schematically illustrated as being mounted to a turbine engine 14 such as a gas turbine engine. The turbine engine can be a turbofan engine or it could be a variety of other known turbine engines such as a turboprop or turboshaft.

The turbine engine 14 comprises an air intake with a fan 16 that supplies air to a high-pressure compression region 18. The air intake with a fan 16 and the high-pressure compression region collectively are known as the 'cold section' of the turbine engine 14 upstream of the combustion. The high-pressure compression region 18 provides a combustion chamber 20 with high pressure air. In the combustion chamber, the high-pressure air is mixed with fuel and combusted. The hot and pressurized combusted gas passes through a high-pressure turbine region 22 and a low-pressure turbine region 24 before exhausting from the turbine engine 14. As the pressurized gases pass through the high-pressure turbine (not shown) of the high-pressure turbine region 22 and the low-pressure turbine (not shown) of the low-pressure turbine region 24, the turbines extract rotational energy from the flow of the gases passing through the turbine engine 14. The high-pressure turbine of the high-pressure turbine region 22 can be coupled to the compression mechanism (not shown) of the high-pressure compression region 18 by way of a shaft to power the compression mechanism. The low-pressure turbine can be coupled to the fan 16 of the air intake by way of the shaft to power the fan 16.

The AGB 12 is coupled to the turbine engine 14 at either the high-pressure turbine region 22 or the low-pressure turbine region 24 by way of a mechanical power take-off 26. The mechanical power take-off 26 contains multiple gears and components for mechanical coupling of the AGB 12 to the turbine engine 14. During starting operating conditions, the air turbine starter 10 can utilize a source of energy to drive kinetic energy or power from the air turbine starter 10 to initiate self-sustaining combustion or "normal running" operating conditions of the turbine engine 14. For example, in one non-limiting example, a source of pressurized air can be utilized to begin rotation of a set of rotors of the turbine engine 14 by way of the AGB 12 and mechanical power take-off 26, until a rotational speed of the set of rotors is high enough to be able to initiate a self-sustaining combustion cycle of turbine engine operation. Under normal running operating conditions, the mechanical power take-off 26 translates power from the turbine engine 14 to the AGB 12 to power accessories of the aircraft for example but not limited to fuel pumps, electrical systems, and cabin environment controls. The air turbine starter 10 can be mounted on the outside of either the air intake region containing the fan 16 or on the core near the high-pressure compression region 18. Optionally, an air intake conduit 27 can couple to the air turbine starter 10. The air intake conduit 27 can supply the air turbine starter 10 with pressurized air.

Figure 2:
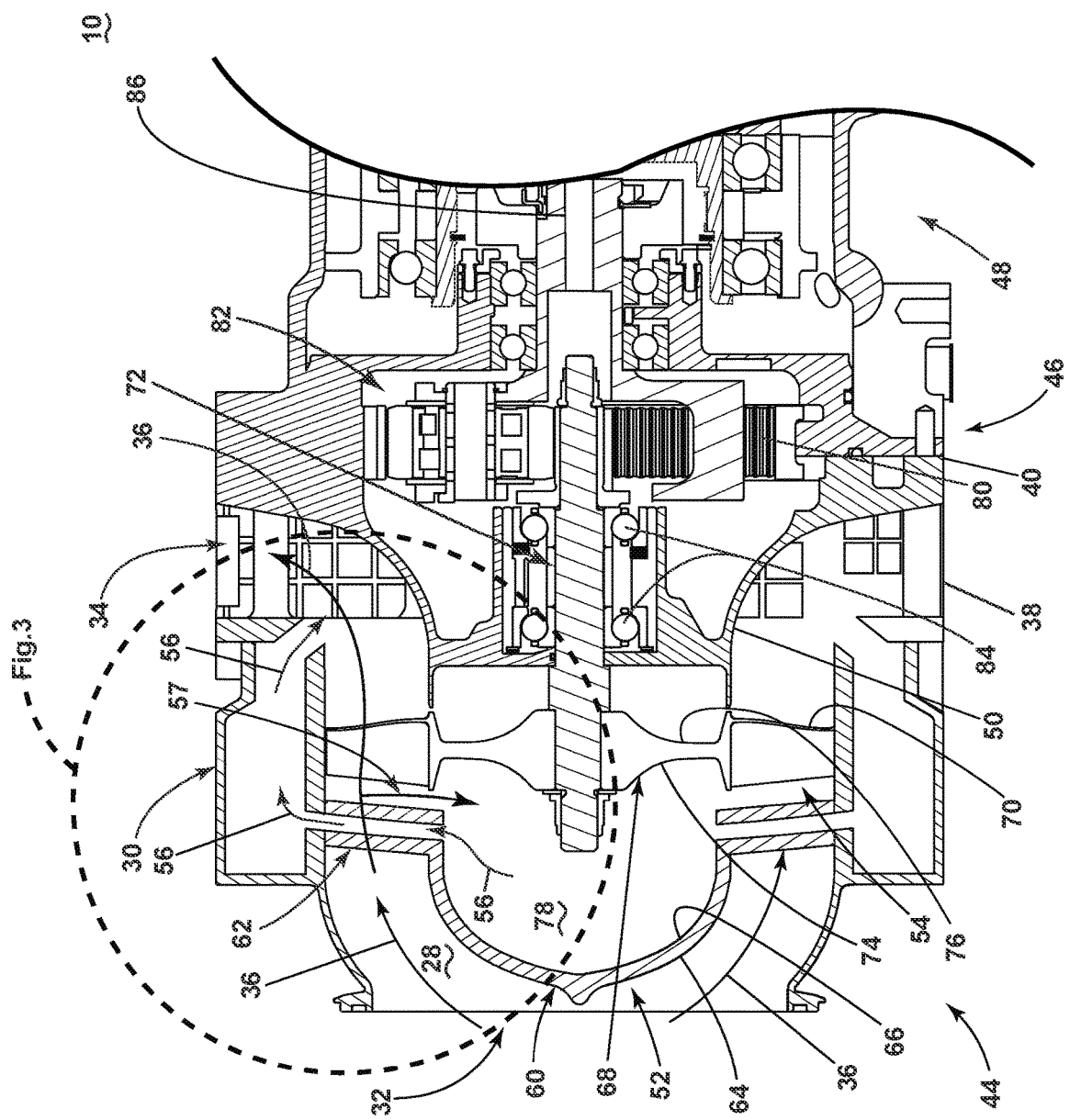
FIG. 2 is an enlarged schematic cross-section view of a portion of the air turbine starter of FIG. 1.

Referring now to FIG. 2, an exploded cross section of a portion of the air turbine starter 10. Generally, the air turbine starter 10 includes a housing 30 defining an interior 28 having a primary inlet 32 and a primary outlet 34. A primary air flow path 36, illustrated schematically with arrows, extends between the primary inlet 32 and the primary outlet 34 for communicating a flow of fluid, including, but not limited to gas, compressed air, or the like, there through. The primary outlet 34 can include a plurality of circumferentially arranged openings 38 in a peripheral wall 40 of the housing 30. In this configuration, the primary inlet 32 is an axial inlet and the primary outlet 34 is a radial or circumferential outlet alone the periphery of the housing 30.

The housing 30 can be made up of two or more parts that are combined together or can be integrally formed as a single piece. In the depicted aspects of the disclosure, the housing 30 of the air turbine starter 10 generally defines, in an axial series arrangement, an inlet turbine section 44, a gearbox section 46, and a drive section 48. A seal structure 50 can be coupled to or unitarily formed with the housing 30. It is contemplated that the seal structure 50 can divide the interior 28 into the inlet turbine section 44 and the gearbox section 46. The air turbine starter 10 can be formed by any materials and methods, including, but not limited to, additive manufacturing or die-casting of high strength and lightweight metals such as aluminum, stainless steel, iron, or titanium. The housing 30 and the gearbox section 46 can be formed with a thickness sufficient to provide adequate mechanical rigidity without adding unnecessary weight to the air turbine starter 10.

The inlet turbine section 44 can include the primary inlet 32, the primary air flow path 36, a stationary structure or stator 52, a rotatable portion or turbine 54, the primary outlet 34, and a secondary air flow path 56. The stator 52 is located in the interior 28 and defines at least a portion of the primary air flow path 36. The stator 52 includes a hub 60 with a plurality of circumferentially spaced vanes 62. The hub 60 can include a front face 64 and a rear face 66, where the front face 64 can, in part can define a portion of the primary air flow path 36.

The turbine 54 can be located in the interior 28 downstream of the stator 52. The turbine 54 can include a rotor 68 with a plurality of circumferentially spaced blades 70 that extend into the primary air flow path 36. A drive shaft 72 can extend from the rotor 68. By way of non-limiting example, the drive shaft 72 extends from a forward face 74 of the rotor 68 to a back face 76 of the rotor 68. It is contemplated that the drive shaft 72 and the rotor 68 can be unitarily formed or otherwise coupled.

A first cavity 78 can be located between the turbine 54 and the stator 52. That is, the first cavity 78 can be, at least in part, defined by the forward face 74 of the rotor 68 and the rear face 66 of the hub 60. The secondary air flow path 56, illustrated schematically with arrows, can fluidly couple the first cavity 78 and the primary air flow path 36.

In one non-limiting example fluid or air is supplied to the primary inlet 32 from either a ground-operating air cart, an auxiliary power unit, or a cross-bleed start from an engine already operating. The air flow, having entered the air turbine starter 10, is directed by the hub 60 or the vanes 62 of the stator 52 which define, at least in part, the primary air flow path 36. At least a portion of the air flow in the primary air flow path 36 rotates the plurality of circumferentially spaced blades 70 and therefore the rotor 68 of the turbine 54. The drive shaft 72, coupled to or formed with the rotor 68, rotates with the turbine 54 allowing for the transfer of energy from the first portion of the air flow to mechanical power. The drive shaft 72 can extend through at least a portion of the inlet turbine section 44 or the gearbox section 46.

By way of non-limiting example, the drive shaft 72 can couple the turbine 54 to one or more gears or clutch assemblies, such as a gear train 80, in the gearbox section 46. The gearbox section 46 can include at least a gear box 82 that can include the gear train 80, at least one bearing assembly 84, and an output 86. The at least one bearing assembly 84 can rotationally support the drive shaft 72 to one of the housing 30 or seal structure 50. The gear box 82 can contain the gear train 80 that couples the drive shaft 72 to the output 86, so that when driven by the drive shaft 72, the gear train 80 can transfer mechanical power to the output 86. The output 86 can then provide rotational energy to the turbine engine 14 via one or more clutch assemblies, decoupler assemblies, or other known transmitters of mechanical energy in the drive section 48, as understood in the art.

Figure 3:
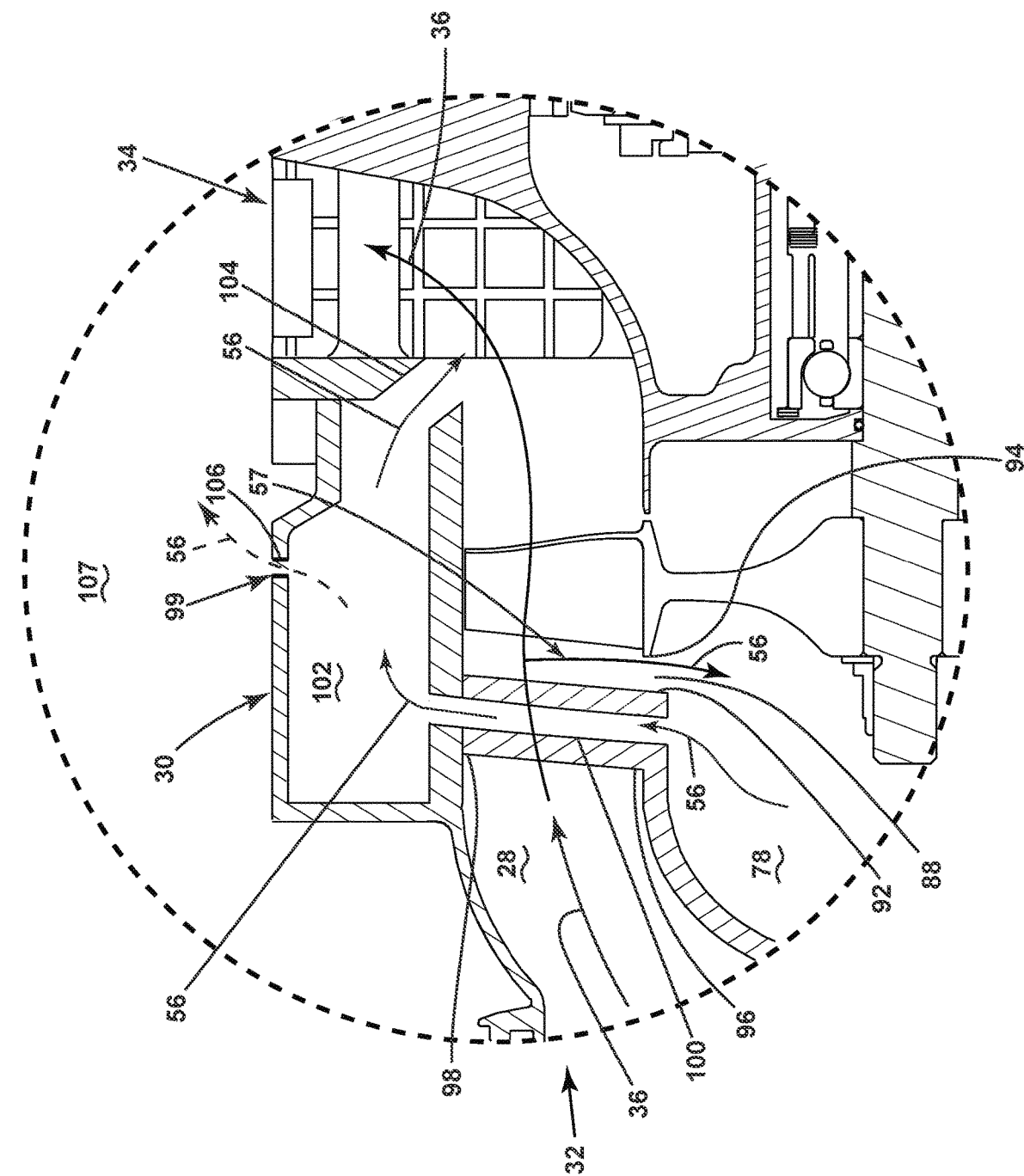
FIG. 3 is a further enlarged view of a portion of the air turbine starter of FIG. 2.

FIG. 3 further illustrates the secondary air flow path 56, which is illustrated schematically by arrows 56. A portion of the air flow 57 from the primary air flow path 36 enters the secondary air flow path 56 downstream of the stator 52 or the vanes 62. The portion of the air flow 57 can pass through a gap or a first cavity inlet 88 to the first cavity 78. The first cavity inlet 88 can be defined by a rear portion 92 of the stator 52 and a forward portion 94 of the turbine 54. That is, the air flow 57 can enter the first cavity 78 from the primary air flow path 36 via the first cavity inlet 88 located downstream of the stator 52 and upstream of the turbine 54. It is contemplated that once the portion of the air flow 57 enters the first cavity 78, the air flow 57 can circulate within the first cavity 78 in a variety of patterns and with a variety of velocities, including zero.

The secondary air flow path 56 can fluidly connect the first cavity 78 with the primary air flow path 36 downstream of the turbine 54. The fluid connection of the first cavity 78 to the primary air flow path 36 via the secondary air flow path 56 reduces the air pressure in the first cavity 78, which balances the air pressure on opposite sides of the rotor 68. By balancing the air pressure on opposite sides of the rotor 68, the axial load on the rotor 68, associated with pressure differential across the rotor 68, is reduced. That is, the secondary air flow path 56 that fluidly connects the first cavity 78 with the primary air flow path 36 downstream of the turbine 54 helps balance the air pressure on opposite sides of the rotor 68 by reducing the air pressure in the first cavity 78 which would otherwise tend to want to axially move the rotor 68 or drive shaft 72.

The vanes 62 of the stator 52 include a root 96 and a tip 98 to define a span-wise direction. A first passage 100 can extend from the root 96 to the tip 98 of at least one of the plurality of circumferentially spaced vanes 62. That is, the first passage 100 can fluidly connect the root 96 and the tip 98 of at least one of the plurality of circumferentially spaced vanes 62. The secondary air flow path 56, can be, in part defined by the first cavity 78 and the first passage 100.

As illustrated, by way of non-limiting example, the secondary air flow path 56 can optionally further include a second cavity 102 or a second passage 104. The first passage 100 fluidly connects the first cavity 78 adjacent the root 96 to the second cavity 102 that is adjacent the tip 98. The second cavity 102 can be defined by the housing 30. The second passage 104 can fluidly connect the second cavity to the primary air flow path 36. Optionally, the secondary air flow path 56 can fluidly connect the first cavity 78 with ambient air exterior 107 of the housing 30 via at least one ambient air passage or channel 106. It is contemplated that the channel 106 can be in addition to or an alternative of the second passage 104. The channel 106 an include a channel outlet 99, where the channel outlet 99 is axially upstream of the primary outlet 34.

Figure 4:
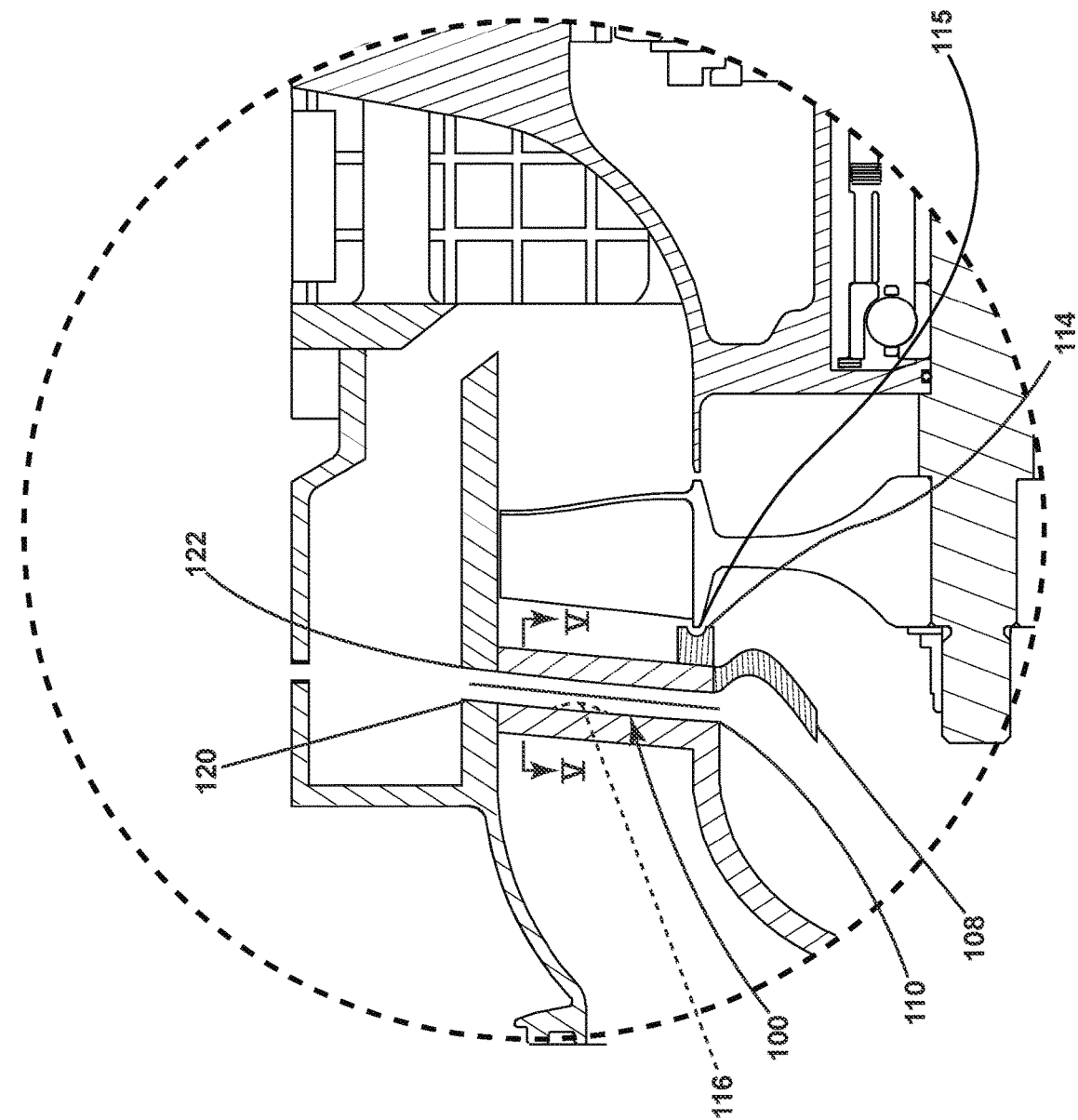
FIG. 4 is a variation of the enlarged portion of the air turbine starter of FIG. 3.

FIG. 4 illustrates additional structures that can be included in the first cavity 78, the first cavity inlet 88, or the first passage 100. The first cavity 78 can include at least one deflector 108. The at least one deflector 108, as illustrated by way of non-limiting example, can be located adjacent to the first cavity inlet 88. The at least one deflector 108 can minimize the volume of the air flow 57 that enters the first cavity 78. Additionally, or alternatively, the at least one deflector 108 can guide the air flow in the first cavity 78 to control speed, direction, or other aspect of the flow. It is further contemplated that the at least one deflector 108 can direct air from the first cavity 78 to a first cavity outlet 110 that fluidly connects the first cavity 78 to the first passage 100.

Optionally, a seal 114 can be located adjacent to or in the first cavity inlet 88. While illustrated as an angel seal with angle wing 115, it is contemplated that the seal 114 can be any labyrinth seal or other known seal in the art.

Optionally, the first passage 100 can include at least one surface geometry 116. The surface geometry 116 is illustrated in dotted lines and can include, in any combination or singularity, forward facing steps, pins, turbulators, aft facing steps, bumps, ridges, or dimples. It is contemplated that surface geometries can also be found in the first cavity 78, the second cavity 102, the second passage 104, or the channel 106.

The first passage 100 can be at least two physically distinct passages 120, 122 that fluidly connecting the root 96 and the tip 98. It is contemplated that the first passage 100 can be any numbers of distinct or intersecting passages. It is also contemplated that the first passage 100 could be a plexus of passages. It is further contemplated that the first passage 100 or any number of passages can include metering or diffusing portions, that is, the first passage 100 can include changing inner dimensions.

Figure 5:
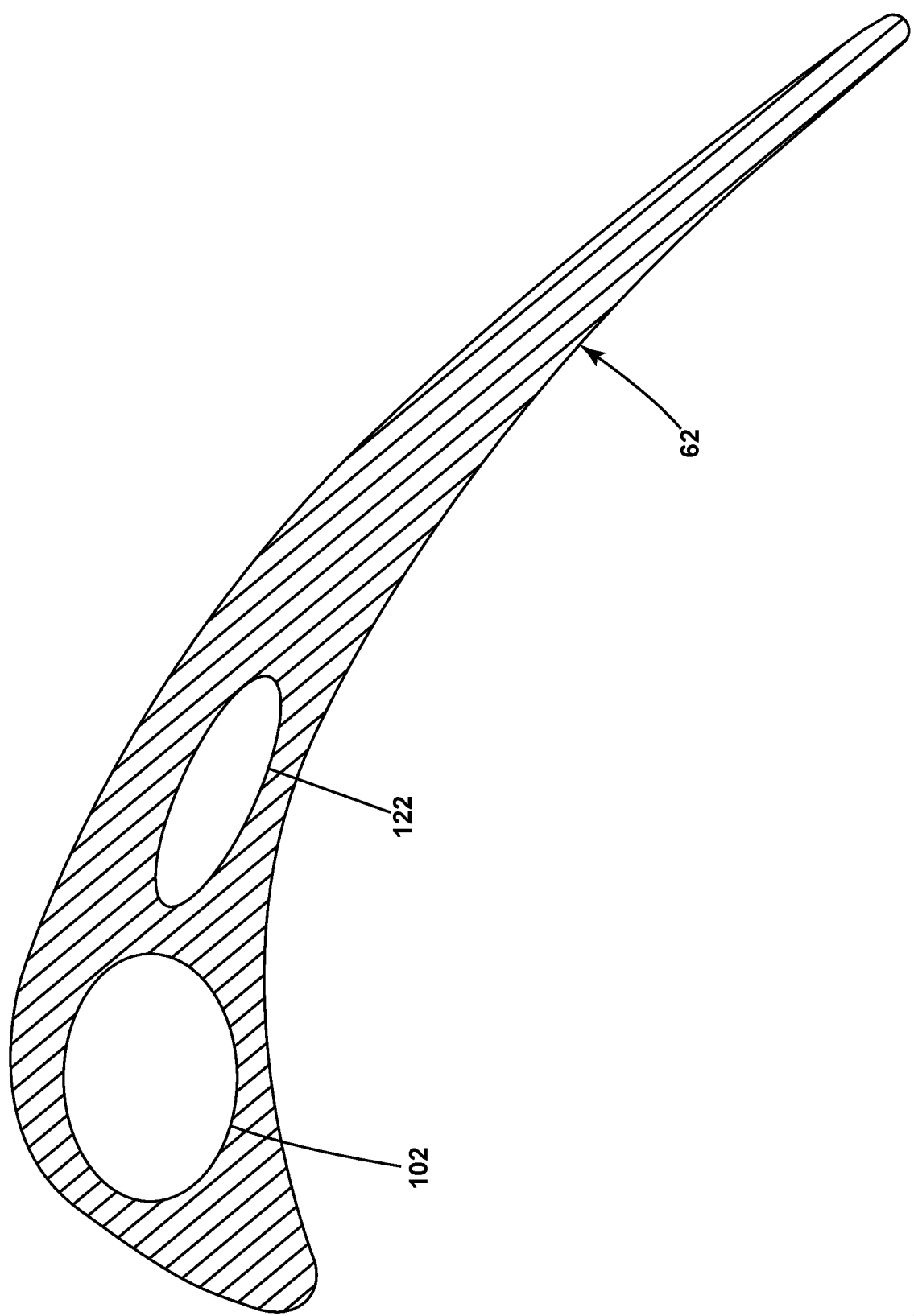
FIG. 5 is a cross section of a portion of the air turbine starter of FIG. 3.

FIG. 5 is a cross section of a portion of the at least one of the plurality of circumferentially spaced vanes 62. Further illustrated are the at least two distinct passages 120, 122 that pass through at least one of the plurality of circumferentially spaced vanes 62. While illustrated as having a cross section that is an oval or elliptical shape, the at least two distinct passages 120, 122 can have any cross-sectional shape, including, but not limited to, rectangular, circular, triangular, regular polygon, irregular polygon, or any combination therein.

In operation, fluid or air is supplied to the primary inlet 32. The air flow, having entered the air turbine starter 10, is directed by the hub 60 or the vanes 62 of the stator 52 which define, at least in part, the primary air flow path 36. Downstream of the stator 52, the air flow splits. A first portion of the air flow continues through the primary air flow path 36. A second portion or the portion of the air flow 57 can pass from the primary air flow path 36 into the secondary air flow path 56. That is, the portion of the air flow 57 can flow from the primary air flow path 36 to the first cavity 78 via the first cavity inlet 88, the seal 114, or the at least one deflector 108. From the first cavity 78, the second portion of the air flow or the portion of the air flow 57 can pass through the vane 62 via the first passage 100 or the at least two distinct passages 120, 122 to the second cavity 102. The portion of the air flow 57 can rejoin the first potion of the air flow in the primary air flow path 36 via the second passage 104. Air can be encouraged to flow through the second passage 104 due to a venturi effect.

Alternatively, it is contemplated that the first passage 100 or the at least two distinct passages 120, 122 can extend from the first cavity 78 to the primary air flow path 36, being further defined by a portion of the housing 30. It is further contemplated that the second cavity 102, the first passage 100, or the at least two distinct passages 120, 122 can fluidly connect to ambient air that is the exterior 107 of the housing 30.

Figure 6:
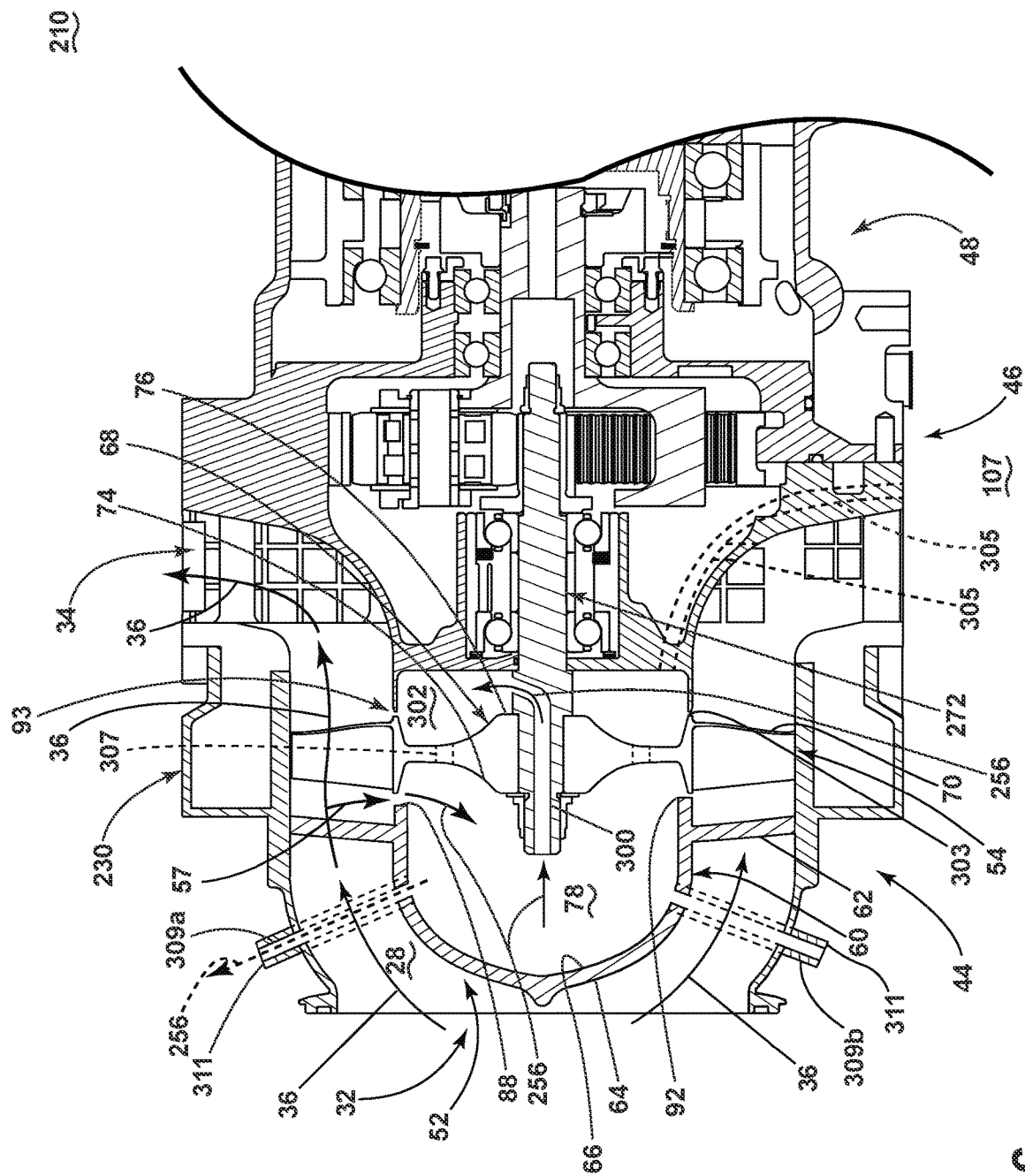
FIG. 6 is a variation of the schematic cross-section of the air turbine starter of FIG. 2.

FIG. 6 is another example of an air turbine starter 210. The air turbine starter 210 is similar to the air turbine starter 10, therefore, like parts will be identified with like numerals increased by 200, with it being understood that the description of the like parts of the air turbine starter 10 apply to the air turbine starter 210, unless otherwise noted.

Generally, the air turbine starter 210 includes a housing 230 defining the interior 28 having the primary inlet 32 and the primary outlet 34. The primary air flow path 36, illustrated schematically with arrows, extends between the primary inlet 32 and the primary outlet 34 for communicating a flow of fluid, including, but not limited to gas, compressed air, or the like, there through.

In the depicted aspects of the disclosure, the housing 230 of the air turbine starter 210 generally defines, in an axial series arrangement, the inlet turbine section 44, the gearbox section 46, and the drive section 48. The air turbine starter 210 can be formed by any materials and methods, including, but not limited to, additive manufacturing or die-casting of high strength and lightweight metals such as aluminum, stainless steel, iron, or titanium. The housing 230 and the gearbox section 46 can be formed with a thickness sufficient to provide adequate mechanical rigidity without adding unnecessary weight to the air turbine starter 210.

The inlet turbine section 44 can include the primary inlet 32, the primary air flow path 36, the stationary structure or stator 52, the rotatable portion or turbine 54, the primary outlet 34, and a secondary air flow path 256. The stator 52 is located in the interior 28 and defines at least a portion of the primary air flow path 36. The stator 52 includes a hub 60 with a plurality of circumferentially spaced vanes 62. The hub 60 can include the front face 64 and the rear face 66.

The turbine 54 can be located in the interior 28 downstream of the stator 52. The turbine 54 can include the rotor 68 with the plurality of circumferentially spaced blades 70 that extend into the primary air flow path 36. A drive shaft 272 with at least one hollow portion can extend from the rotor 68. By way of non-limiting example, the drive shaft 272 extends from the forward face 74 of the rotor 68 to the back face 76 of the rotor 68. It is contemplated that the drive shaft 272 and the rotor 68 can be unitarily formed or otherwise coupled.

The first cavity 78 can be located between the turbine 54 and the stator 52. That is, the first cavity 78 can be, at least in part, defined by the forward face 74 of the rotor 68 and the rear face 66 of the hub 60. The portion of the air flow 57 can flow from the primary air flow path 36 through the first cavity inlet 88 into the first cavity 78. The secondary air flow path 256 can include the first cavity 78, a first passage or shaft channel 300, a second cavity 302, and a second cavity outlet 303.

The hollow portion of the drive shaft 272 can define the shaft channel 300. That is, the shaft channel 300 extends through a portion of the drive shaft 272. The shaft channel 300 can fluidly connect the first cavity 78 to the second cavity 302. While the shaft channel 300 is illustrated as extending in an axial and radial direction, any combination of axial or radial channels that to form the shaft channel 300 are contemplated.

The second cavity 302 can be defined, in part, by the housing 230 and the back face 76 of the rotor 68. The second cavity outlet 303 is located at the rear portion 93 of the turbine 54. The second cavity outlet 303 is illustrated, by way of non-limiting example, as located adjacent a trailing edge of the plurality of circumferentially spaced blades 70. The second cavity outlet 303 can fluidly connect the second cavity 302 to the primary air flow path 36. It is contemplated that additionally, or alternatively, one or more passages or channels 305 defined by the housing 230 can fluidly couple the second cavity 302 to the primary air flow path 36 or the ambient air at the exterior 107 of the housing 230.

The portion of the air flow 57 that enters the first cavity 78 can increase the pressure in the first cavity 78 relative to the second cavity 302. That is, the portion of the air flow 57 that enters the first cavity 78 can increase the pressure differential across the rotor 68. The increase in pressure in the first cavity 78 can result in an axial force on the rotor 68 or drive shaft 272. To reduce or eliminate the pressure differential across the rotor 68 formed by the influx of the air flow 57, air from the first cavity 78 can flow through the shaft channel 300 in the drive shaft 72 to the second cavity 302. The second cavity 302 is downstream of the rotor 68. As air flows from the first cavity 78 to the second cavity 302, the pressure is equalized between the cavities and the axial force on the rotor 68 is reduced. Air from the second cavity 302 can rejoin the primary air flow path 36 or join ambient air through the second cavity outlet 303 or the one or more passages or channels 305 in the housing 230.

It is further contemplated that at least one rotor passage 307 can also fluidly connect the first cavity 78 and the second cavity 302. The at least one rotor passage can extend through the rotor in an axial direction, however different shapes, sizes, and curvature to the at least one rotor passage are contemplated.

Optionally, the air turbine starter 210 can also include a stator channel, illustrated, by way of non-limiting example, as a first stator channel 309a and a second stator channel 309b. The first and second stator channels 309a, 309b pass through a portion of the stator 52 and a portion of the housing 230. The first and second stator channels 309a, 309b fluidly couples the first cavity 78 with ambient air upstream of the stator 52. That is, a stator channel outlet 311 can be located upstream of the primary outlet 34, the vanes 62, the stator 52, or the turbine 54.

It is contemplated that the secondary air flow path 56, 256 can be any combination of one or more of the first passage 100, the second passage 104, the ambient air passage 106, the shaft channel 300, the second cavity outlet 303, the at least one rotor passage 307, or the first and second stator channel 309a, 309b.

Benefits associated with aspects of the disclosure herein include a reduced pressure differential in the first cavity. The decrease in the pressure differential using the first passage, shaft channel, or stator channel results in a decrease in the axial force or load on the rotor. A decrease in axial force on the rotor decreases the axial load at the at least one bearing assembly. This results in a reduction of operating temperature of the at least one bearing assembly. The temperature of the bearings is often one of the limiting factors in determining the length of time the air turbine starter can operate before requiring cool down time.

Aspects of the present disclosure reduce the temperature of the at least one bearing assemblies and can provide for better alignment of the drive shaft, which increases the amount of time the air turbine starter can operate. This also increases part life. By reducing the axial load (by reducing pressure differential), the present disclosure provides a reduced thermal load on the at least one bearing assembly or thrust bearing of the air turbine starter.

Aspects of the present disclosure reduce the temperature of the at least one bearing assemblies, which increases the speed at which the rotatable components of the air turbine starter can rotate.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

1. An air turbine starter comprising a housing defining an interior having a primary inlet and a primary outlet to define a primary air flow path from the primary inlet to the primary outlet, a stator located in the interior that defines at least a portion of the primary air flow path, where the stator includes a hub with a plurality of circumferentially spaced vanes that include a root and a tip to define a span-wise direction, a first passage extending from the root and the tip of at least one of the plurality of circumferentially spaced vanes;
a turbine located in the interior downstream of the stator and including a rotor, with a plurality of circumferentially spaced blades extending into the primary air flow path, a first cavity defined by a forward face of the rotor and a rear face of the hub, and a secondary air flow path that fluidly connects the first cavity with either the primary air flow path downstream of the turbine or ambient air, wherein the secondary air flow path is at least partially defined by the first passage.

2. The air turbine starter of clause 1, wherein the first passage is at least two physically distinct passages fluidly connecting the root and the tip.

3. The air turbine starter of any preceding clause, further comprising a second passage fluidly connecting the first cavity to the primary air flow path downstream of the turbine.

4. The air turbine starter of any preceding clause, wherein the first passage of the at least one of the plurality of circumferentially spaced vanes fluidly connects the first cavity to a second cavity defined by the housing.

5. The air turbine starter of any preceding clause, further comprising a channel with a channel outlet that is defined by the housing, wherein the channel fluidly couples the second cavity to the ambient air and the channel outlet is located axially upstream of the primary outlet.

6. The air turbine starter of any preceding clause, wherein the first cavity includes a first cavity inlet defined by a rear portion of the stator and a forward portion of the turbine.

7. The air turbine starter of any preceding clause, further comprising a deflector coupled to the stator adjacent the first cavity inlet.

8. The air turbine starter of any preceding clause, further comprising a seal located in the first cavity inlet.

9. An air turbine starter comprising a housing defining an interior having a primary inlet and a primary outlet to define a primary air flow path from the primary inlet to the primary outlet, a stator located in the interior that defines at least a portion of the primary air flow path, where the stator includes a hub, with a plurality of circumferentially spaced vanes, a turbine located in the interior downstream of the stator and including a rotor, with a plurality of circumferentially spaced blades extending into the primary air flow path, a first cavity defined by a forward face of the rotor and a rear face of the stator, and a secondary air flow path that fluidly connects the first cavity with the primary air flow path downstream of the turbine or ambient air.

10. The air turbine starter of any preceding clause, further comprising a drive shaft coupled to the turbine and including a shaft channel that passes through a portion of the drive shaft, wherein the shaft channel fluidly couples the first cavity with a second cavity.

11. The air turbine starter of any preceding clause, wherein the secondary air flow path is partially defined by a second cavity outlet located at a rear portion of the turbine, wherein the second cavity outlet fluidly couples the second cavity to the primary air flow path downstream of the turbine or ambient air.

12. The air turbine starter of any preceding clause, further comprising a stator channel that passes through a portion of the stator and a portion of the housing, wherein the stator channel fluidly couples the first cavity with ambient air upstream of the stator.

13. The air turbine starter of any preceding clause, wherein the stator channel includes at least a first stator channel and a second stator channel.

14. The air turbine starter of any preceding clause, wherein at least one of the plurality of circumferentially spaced vanes includes a first passage extending from a root to a tip that defines a portion of the secondary air flow path.

15. The air turbine starter of any preceding clause, wherein the at least one of the plurality of circumferentially spaced vanes includes at least a first passage and a second passage that fluidly connect the root and the tip.

16. The air turbine starter of any preceding clause, wherein the first cavity is fluidly coupled to the primary air flow path downstream of the turbine via a second passage.

17. The air turbine starter of any preceding clause, wherein the first passage of the at least one of the plurality of circumferentially spaced vanes fluidly connects the first cavity to a second cavity defined by the housing.

18. The air turbine starter of any preceding clause, wherein the first cavity includes a first cavity inlet defined by a rear portion of the stator and a forward portion of the turbine.

19. The air turbine starter of any preceding clause, further comprising a deflector coupled to the stator adjacent the first cavity inlet.

20. The air turbine starter of any preceding clause, further comprising a seal located in the first cavity inlet.

What is claimed is:

1. An air turbine starter comprising:
a housing defining an interior and having a primary inlet and a primary outlet to define a primary air flow path from the primary inlet, through the interior, to the primary outlet;
a stator located in the interior that defines at least a portion of the primary air flow path, wherein the stator includes a hub with a plurality of circumferentially spaced vanes extending therefrom, where each vane of the plurality of circumferentially spaced vanes includes a root and a tip, and the hub is formed by a wall having a forward face and a rear face;
a first passage extending from the root to the tip of one vane of the plurality of circumferentially spaced vanes;
a turbine located in the interior and including a rotor, with a plurality of circumferentially spaced blades extending therefrom into the primary air flow path downstream of the plurality of circumferentially spaced vanes;
a first cavity defined by a forward face of the rotor and the rear face of the hub, wherein the first cavity is fluidly coupled to the first passage; and
a secondary air flow path that fluidly connects the first cavity with either the primary air flow path or ambient air outside the housing, wherein the secondary air flow path is at least partially defined by the first passage.

2. The air turbine starter of claim 1, wherein the first passage is at least two physically distinct passages fluidly connecting the root to the tip.

3. The air turbine starter of claim 1, further comprising a second passage fluidly connecting the first cavity to the primary air flow path downstream of the turbine, wherein upstream and downstream are defined by air flow in the primary air flow path.

4. The air turbine starter of claim 1, wherein the first passage fluidly connects the first cavity to a second cavity defined in the housing.

5. The air turbine starter of claim 4, further comprising a channel with a channel outlet that is defined by the housing, wherein the channel fluidly couples the second cavity to the ambient air and the channel outlet is located between the primary inlet and the primary outlet.

6. The air turbine starter of claim 1, wherein the first cavity includes a first cavity inlet defined between the stator and the turbine.

7. The air turbine starter of claim 6, further comprising a deflector coupled to the stator adjacent the first cavity inlet.

8. The air turbine starter of claim 6, further comprising a seal located in the first cavity inlet.

9. An air turbine starter comprising:
a housing defining an interior and having a primary inlet and a primary outlet to define a primary air flow path from the primary inlet, through the interior, to the primary outlet;
a stator located in the interior that defines at least a portion of the primary air flow path, where the stator includes a hub and a plurality of circumferentially spaced vanes extending therefrom, the hub formed by a wall defining a forward face and a rear face;
a turbine located in the interior, downstream of the stator in the primary air flow path, and including a rotor, with a plurality of circumferentially spaced blades extending into the primary air flow path from the rotor;
a drive shaft extending through the rotor and at least a portion of the drive shaft extending rearward of the rotor;
a first cavity defined by a forward face of the rotor and the rear face of the stator; and
a second cavity defined by a rear face of the rotor, the drive shaft, and a first portion that is a seal portion of the housing, a second cavity outlet of the second cavity formed between the rear face of the rotor and the seal portion of the housing or formed in the seal portion of the housing; and
a shaft channel that passes through a portion of the drive shaft to fluidly couple the first cavity with the second cavity, wherein the shaft channel includes an inlet at the first cavity and an outlet at the second cavity.

10. The air turbine starter of claim 9, wherein a secondary air flow path is partially defined by the second cavity outlet, wherein the second cavity outlet fluidly couples the second cavity to the primary air flow path or ambient air outside the housing.

11. The air turbine starter of claim 9, further comprising a stator channel that passes through a portion of the stator and a second portion of the housing, wherein the stator channel fluidly couples the first cavity with ambient air outside the housing and forward of the stator.

12. The air turbine starter of claim 11, wherein the stator channel includes at least a first stator channel and a second stator channel.

13. The air turbine starter of claim 9, wherein one of the plurality of circumferentially spaced vanes includes a first passage extending from a root of the one of the plurality of circumferentially spaced vanes to a tip of the one of the plurality of circumferentially spaced vanes to define a portion of a secondary air flow path.

14. The air turbine starter of claim 13, wherein the one of the plurality of circumferentially spaced vanes includes the first passage and a second passage that each fluidly connect the root and the tip.

15. The air turbine starter of claim 14, wherein the first cavity is fluidly coupled to the primary air flow path downstream of the turbine via the second passage, wherein downstream is determined by air flow in the primary air flow path.

16. The air turbine starter of claim 13, wherein the first passage of the one of the plurality of circumferentially spaced vanes fluidly connects the first cavity to a third cavity defined in the housing.

17. The air turbine starter of claim 13, wherein the first cavity includes a first cavity inlet defined between the stator and the turbine.

18. The air turbine starter of claim 17, further comprising a deflector coupled to the stator adjacent the first cavity inlet.

19. The air turbine starter of claim 17, further comprising a seal located in the first cavity inlet.

\* \* \* \* \*